United States Patent Office 3,268,037
Patented August 23, 1966

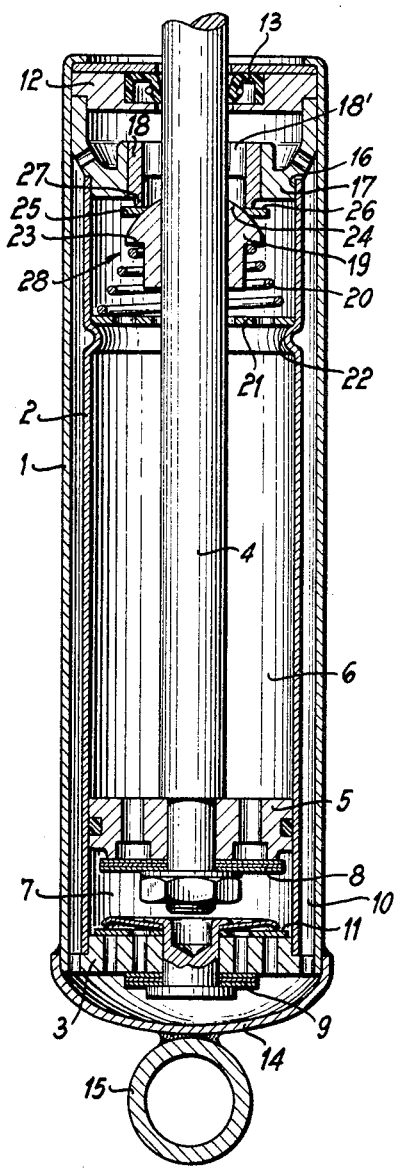

3,268,037
VALVE-IN-LIQUID SHOCK ABSORBERS
Alexander von Löwis of Menar, Mauren uber Ehningen, Kreis Boblingen, Germany, assignor to Robert Bosch G.m.b.H., Stuttgart, Germany
Filed Sept. 30, 1964, Ser. No. 400,457
Claims priority, application Germany, Oct. 4, 1963, B 73,753
4 Claims. (Cl. 188—100)

The present invention relates to shock absorbers and in particular to liquid-type shock absorbers adapted particularly for use in automobiles and other vehicles.

In shock absorbers of this type a piston slides in a cylinder and has a piston rod extending outwardly beyond the cylinder through a bearing sleeve. This bearing sleeve is conventionally mounted in a yieldable sleeve in an end wall of the cylinder and in addition the bearing sleeve at its outer end presses against a ring, a suitable seal being formed for the shiftable piston rod by a yieldable ring extending from the bearing sleeve toward the interior of the cylinder.

This known structure, however, does not provide a suitable solution to the problem of fluid-tightly sealing the piston rod since in the first place the soft sealing structure is necessarily incapable of maintaining a proper seal at the relatively high pressures and temperatures to which the shock absorber is subjected during operation, and since in the second place radial displacements and/or vibrations of the piston rod provide sharply localized stresses on the seal and bearing sleeve as a result of the opposing elastic forces induced in the yieldable sleeve. Both types of stresses, namely, the stresses resulting from the high pressures and temperatures and the stresses resulting from the one-sided yielding of the bearing assembly result in early wearing away of the seal and disadvantageous changes in the operation of the shock absorber.

It is accordingly a primary object of the present invention to provide a shock absorber of the above general type which will avoid the above drawbacks of the known structures.

Thus, it is an object of the invention to provide a piston rod sealing assembly which will reliably prevent pronounced, one-sided, localized stresses.

Also, it is an object of the present invention to provide a piston rod assembly which is capable of withstanding the high pressures and temperatures during operation of the shock absorber.

Furthermore, it is an object of the present invention to provide a liquid shock absorber of the above type which will be capable of maintaining reliably a constant operation of the shock absorber over a long period of time.

With the above objects in view the invention includes, in a liquid-type shock absorber, a cylinder and a piston slidable therein, this piston being fixed to a piston rod which extends from the piston outwardly beyond the cylinder through a first bearing sleeve which is carried by the cylinder. A second bearing sleeve surrounds the piston rod with only a slight clearance and is located adjacent the first bearing sleeve inwardly of the cylinder, and a spring means in the cylinder urges the second bearing sleeve toward the first bearing sleeve while, according to a particular feature of the present invention, a ball-and-socket joint means limits the movement of the second bearing sleeve toward the first bearing sleeve while freeing the second bearing sleeve for at least limited radial movement with respect to the first bearing sleeve.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which one possible embodiment of a structure according to the invention is illustrated in a longitudinal sectional view.

A double-cylinder type of liquid shock absorber is illustrated in the drawing, and this shock absorber includes an outer cylinder 1 and an inner cylinder 2 coaxially arranged within the inner cylinder 1 to define therewith the elongated tubular space 10 situated between the inner and outer cylinders 1 and 2. The inner cylinder 2 fixedly carries at its bottom end, as viewed in the drawing, an end wall 3 whose outer periphery is fixed to the inner surface of the outer cylinder 1 so as to maintain the inner cylinder 2 coaxially arranged within the outer cylinder 1, the peripheral portion of the end wall 3 which extends beyond the inner cylinder 2 being formed with suitable cutouts so that the space 10 between the cylinders can communicate through the periphery of the end wall 3 with the space beneath this end wall 3, as viewed in the drawing.

The cylinder 2 slidably receives in its interior a piston 5 which is coaxially fixed to a piston rod 4 which extends outwardly beyond the cylinders so that the upper end of the piston rod 4 can be fixed in a manner well known in the art to the body or chassis of the vehicle.

The piston 5 divides the interior of the cylinder 2 into an upper chamber 6 and a lower chamber 7. A prestressed damping valve 8 is carried by the piston 5 and cooperates with openings passing therethrough to permit fluid to flow through the piston 5 from the chamber 6 into the chamber 7 while preventing the reverse flow of fluid from the chamber 7 through the piston 5 into the chamber 6. The end wall 3 is formed with openings passing therethrough and closed by a prestressed damping valve 9 which enables the chamber 7 to communicate through the valve 9 with the space 10. Additional openings in the end wall 3 are closed by a non-return valve plate 11 which permits fluid to flow from the space 10 into the chamber 7, and springy fingers engage the plate 11 to urge the latter downwardly against the wall 3, these springy fingers providing free communication between the interior of the chamber 7 and inner openings of the valve plate 11 which are aligned with those openings of the wall 3 which are covered by the valve 9.

The upper end of the outer cylinder 1 is closed by a closure plate 12 which is formed with a central recess housing a sealing ring 13 which fluid-tightly surrounds and engages the piston 5 so that the latter can slide fluid-tightly through the sealing ring 13.

The bottom end of the cylinder 1 is fluid-tightly closed by a dome-shaped cap 14 which fixedly carries at its exterior the shock absorber fitting 15 enabling the shock absorber to be connected in a known way to the axle of the vehicle, this fitting 15 being in the form of an eye.

The upper end 16 of the inner cylinder 2 is closed by a head member 17 which fixedly carries a first bearing 18 which surrounds and slidably engages the piston rod 4, and this bearing 18 is formed in the region of the rod 4 with axial passages 18' through which the liquid can freely flow, and it will be noted that the space above the bearing 18 between the latter and the plate 12 communicates freely with the space 10 through openings which are formed in the head member 17 beyond the cylinder 2.

In accordance with the present invention a second bearing sleeve 19 surrounds the piston rod 4 with only a slight clearance and is situated adjacent the first bearing sleeve 18 inwardly of the cylinder 2. A spring means within the cylinder 2 urges the second bearing sleeve 19 toward the first bearing sleeve 18, and this spring means in the illustrated example takes the form of a tapered coil spring 20 which presses at its larger end against an apertured disk 21 formed with a central opening through which the piston rod 4 freely passes as well as with additional openings so that the liquid can flow through the disk 21. The cylinder 2 is formed with an inwardly directed annular bead 22 on which the disk 21 is seated. The smaller end of the coil spring 20 bears against a shoulder 23 of the sleeve 19 so as to urge the latter toward the sleeve 18. The upper end 24 of the sleeve 19 has a convex configuration forming part of a sphere and is received in a ring 25 which has an inner periphery forming part of a sphere of the same size as that of which the upper end 24 of the sleeve 19 forms a part, so that there is a good sliding fit between the sleeve 19 and the ring 25, while at the same time these elements form a ball-and-socket type of joint means. The upper face 26 of the ring 25 is flat and is pressed by the spring 20 against the inwardly directed end face 27 of the bearing 18, this end face 27 also being flat, so that in this way the ball-and-socket joint means 24, 25 provides between the sleeve 19 and the sleeve 18 a limited freedom of radial movement in all directions with respect to the axis of the piston 4, this radial movement being brought about by the capability of the face 26 of ring 25 to slide with respect to the end face 27 of the bearing 18.

The spring 20, the sleeve 19, the ring 25 and the sleeve 18 with its end 27 all cooperate to form a non-return valve assembly 28 permitting fluid to flow from the space 10 through the passages 18' into the chamber 6, while preventing the liquid from flowing in the reverse direction, and the liquid will flow from the space 10 into the chamber 6 whenever the pressure in the space 10 is greater than that in the chamber 6. Such a pressure differential occurs when during springing of the vehicle the piston 5 moves downwardly toward the end wall 3 so as to tend to increase the volume of the chamber 6 thus producing a suction which draws liquid from the space 10 through the passages 18' into the chamber 6 as a result of the action of the non-return valve means 28.

During springing in the opposite direction when the piston 5 moves away from the end wall 3 the volume of the chamber 6 will of course diminish, and at this time the valve 8 will respond since the non-return valve means 28 does not permit the liquid to flow from the chamber 6 into the space 10 through the passages 18'. It is to be noted that at this time the sleeve 19 provides a very effective seal about the piston rod 4 while at the same time a film of liquid lubricates the seal between the spherical portion 24 of the sleeve 19 and the ring 25 as well as between the ring 25 and the end 27 of the bearing 18. Thus, it is possible for the sealing unit 18, 25, 19, 20 to maintain the desired seal while at the same time providing a limited radial yieldability for the piston rod 4, so that radial vibrations of the latter, for example, can be absorbed by slight radial movements of the components of this sealing unit.

Thus, while the parts 18, 25 and 19 can function in the nature of a valve seat and valve member movable with respect thereto so as to form the non-return valve assembly 28, at the same time these parts provide the limited freedom for the piston rod 4.

It will be understood that each of the elements described above, or two or more together, may also find a useful application in other types of shock absorbers differing from the types described above.

While the invention has been illustrated and described as embodied in liquid-type shock absorbers, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a liquid shock absorber, in combination, a cylinder; a piston slidable in said cylinder; a piston rod fixed to said piston and extending from the latter outwardly beyond said cylinder; a first bearing sleeve carried by said cylinder and surrounding said piston rod to guide the latter for axial movement; a second bearing sleeve located in said cylinder adjacent said first sleeve and surrounding said piston rod with slight clearance; spring means in said cylinder engaging said second sleeve and urging the latter toward said first sleeve; and ball-and-socket means situated between said sleeves for limiting the movement of said second sleeve toward said first sleeve while providing for said second sleeve at least a limited freedom of radial movement relative to said first sleeve.

2. In a shock absorber as recited in claim 1, said ball-and-socket means including an end of said second sleeve which is directed toward said first sleeve and which forms part of a sphere, a ring surrounding and engaging said end of said second sleeve with an inner periphery of said ring which also forms part of said sphere, said ring having a flat face directed away from said second sleeve and toward said first sleeve, and said first sleeve having a flat end face slidably engaged by said flat face of said ring so that said ring together with said end of said second sleeve form a ball-and-socket means which has a limited freedom of radial movement at the interface between said flat face of said ring and said flat end of said first sleeve.

3. In a shock absorber as recited in claim 2, said first sleeve being formed with passages extending axially therethrough and said ring and end of said second sleeve closing said passages and acting as a non-return valve for preventing flow of fluid through said passages in one direction.

4. In a shock absorber as recited in claim 1, said first sleeve being formed with passages extending axially therethrough and said ball-and-socket means forming a non-return valve for preventing flow of fluid through said passages in one direction only.

References Cited by the Examiner

FOREIGN PATENTS 497,911   11/1953   Canada.

MILTON BUCHLER, *Primary Examiner.*

G. E. A. HALVOSA, *Assistant Examiner.*